(12) United States Patent
Caradimos

(10) Patent No.: US 7,216,789 B2
(45) Date of Patent: May 15, 2007

(54) STEERING WHEEL WORKSTATION SUPPORT FOR A LAPTOP COMPUTER

(76) Inventor: Robert A. Caradimos, 11 Peter Cooper Dr., Wareham, MA (US) 02571

( * ) Notice: Subject to any disclaimer, the term of this patent is extended or adjusted under 35 U.S.C. 154(b) by 0 days.

(21) Appl. No.: 10/685,293

(22) Filed: Oct. 14, 2003

(65) Prior Publication Data
US 2005/0077333 A1    Apr. 14, 2005

(51) Int. Cl.
B60R 7/00    (2006.01)
(52) U.S. Cl. .................. 224/276; 224/441; 108/44; 248/441.1
(58) Field of Classification Search ............ 224/276, 224/441; 248/441.1, 441.2; 108/44; D6/419
See application file for complete search history.

(56) References Cited

U.S. PATENT DOCUMENTS

| | | | | |
|---|---|---|---|---|
| 651,058 | A * | 6/1900 | Rogers | 248/441.1 |
| 936,936 | A * | 10/1909 | Phelps | 248/457 |
| 1,247,033 | A * | 11/1917 | Swartz | 248/459 |
| 1,361,981 | A * | 12/1920 | Goodnow | 40/761 |
| 1,717,433 | A * | 6/1929 | Bragg et al. | 248/447.2 |
| 2,314,550 | A * | 3/1943 | Olman | 108/44 |
| 2,487,536 | A * | 11/1949 | Fiscus | 248/447.1 |
| 3,074,745 | A * | 1/1963 | Rey | 108/44 |
| 5,177,665 | A | 1/1993 | Frank et al. | |
| 5,370,060 | A | 12/1994 | Wang | |
| 5,487,521 | A | 1/1996 | Callahan | |
| 5,511,493 | A | 4/1996 | Kanehl | |
| 5,542,314 | A * | 8/1996 | Sullivan et al. | 74/552 |
| 5,662,047 | A * | 9/1997 | Metcalf | 108/44 |
| 5,749,306 | A | 5/1998 | Breuner | |
| 5,899,421 | A | 5/1999 | Silverman | |
| 5,915,661 | A | 6/1999 | Silverman et al. | |
| 5,953,999 | A | 9/1999 | Kanehl | |
| 6,062,145 | A | 5/2000 | Lin | |
| 6,148,738 | A | 11/2000 | Richter | |
| 6,505,797 | B1 * | 1/2003 | Dempsey | 248/166 |
| 2004/0083930 | A1 | 5/2004 | Han | |

OTHER PUBLICATIONS

Arkon Resources, Inc., Recent News & Press Releases, p. 1 (http://www.arkon.com/new2.html, Sep. 11, 2003).
Arkon Resources, Inc.—Laptop and Notebook Accessories, p. 2 (http://www.arkon.com/laptop.html, Sep. 11, 2003).

* cited by examiner

Primary Examiner—Tri M. Mai
(74) Attorney, Agent, or Firm—Bromberg & Sunstein LLP

(57) ABSTRACT

A steering wheel workstation support is provided for mounting a laptop computer. The steering wheel workstation support contains a support portion with a lip, a hook arrangement, and a standoff member integrally formed from a single piece of material. The support portion lip secures the laptop base. The hook arrangement attaches the workstation support to the steering wheel. The standoff member, located on the back of the support portion, causes the lower end of the support portion to be displaced from a lower part of the steering wheel so as to present the laptop keyboard and display at ergonomically desirable angles. In addition, the workstation support may be placed on a horizontal surface so as to present the laptop display to viewers.

8 Claims, 7 Drawing Sheets

STEERING WHEEL WORKSTATION SUPPORT FOR A LAPTOP COMPUTER

TECHNICAL FIELD

The present invention relates to a steering wheel workstation support, and more particularly, to a steering wheel workstation support for holding a laptop computer.

BACKGROUND ART

Laptop computers are necessities in business, especially for those whose work takes them by car between customer and division locations. Between visits, a user must often use the laptop to prepare for an upcoming visit or to process the results of a just concluded one. In addition, the user may need to communicate with his home location to check and respond to messages received in his absence. Often, this communication is over the Internet.

When seeking to use a laptop in a car, the user encounters serious difficulties. Most importantly, there is the need to present the laptop keyboard at a comfortable and ergonomically desirable angle and position and the need to present the display in such a manner as not to lead to vision or muscle strain. Although the car steering wheel offers a potential support for the laptop, alone it cannot meet the support requirements.

In addition to accessing a laptop on the road between visits, a user also uses the laptop during visits, for example, as a means of presentation to a group. By using his own laptop instead of depending on the variable facilities of different sites, the user can quickly initiate his talk without the necessity of individualized preparation. However, a laptop on a tabletop ineffectively delivers information. The screen is often low, presenting viewing difficulties to the audience not seated immediately adjacent to the laptop.

SUMMARY OF THE INVENTION

In accordance with one aspect of the invention, a steering wheel workstation support for a laptop computer having a base with a front edge and a display foldingly related, contains a support portion, a lip, a hook arrangement, and a standoff member integrally formed from a single piece of material.

The support portion containing a lower region, an upper region, a back, and a front is dimensioned to support on its front at least the base of the laptop. In some embodiments, the support portion contains a plurality of arms. In certain embodiments, the arms terminate in hooks. In other embodiments, the arms are connected by a crosspiece.

The lip, located at the lower region of the support portion, receives the front edge of the laptop base. In certain embodiments, the support portion has a height measured along its surface perpendicular to the lip of not less than 9 inches. In other embodiments, the lip contains retainers disposed on opposite sides of a central region. In still other embodiments, the central region is void of the retainers.

The hook arrangement is designed to hook onto the steering wheel from the upper region of the support portion. In some embodiments, the hook arrangement can include two hooks. In other embodiments, each hook has a terminus curving away from the support portion.

The standoff member, located on the back of the support portion, is positioned to cause the lower end of the support portion to be displaced from a lower part of the steering wheel. In other embodiments, the standoff member is configured in relation to the support portion to cause the workstation support, when in use on a steering wheel, to present the base of the laptop to a user seated in a vehicle behind the steering wheel at an obtuse angle as measured from the front of the support portion relative to the horizontal, convenient for use of a keyboard on the base of the laptop. In certain embodiments, the standoff member has the shape of an inverted "V", an inverted "U", or an "A".

In accordance with another aspect of the invention, a steering wheel workstation support for a laptop computer having a base with a front edge and a display foldingly related, contains a support portion, a lip, a hook arrangement, and a standoff member.

The support portion containing a lower region, an upper region, a back, and a front is dimensioned to support on its front at least the base of the laptop. The lip, located at the lower region of the support portion, receives the front edge of the laptop base. In certain embodiments, the support portion has a height measured along its surface perpendicular to the lip of not less than 9 inches.

The hook arrangement is designed to hook onto the steering wheel from the upper region of the support portion. In some embodiments, the hook arrangement includes two hooks.

The standoff member, located on the back of the support portion, is positioned to cause the lower end of the support portion to be displaced from a lower part of the steering wheel. In addition, the standoff member is also positioned so as to permit the workstation support to be supported by the lip and the standoff member on a horizontal surface with the support portion at an obtuse angle thereto less than 135 degrees with respect to the horizontal as measured from the front of the support portion, so as to permit use of the workstation support as a display stand for the laptop.

In accordance with an additional aspect of the invention, a method of mounting a laptop computer having a display and a base with a keyboard to a steering wheel involves providing a workstation support with integral support portion, hook attachment, and standoff member. The support is dimensioned to support on its front at least the laptop base, the hook arrangement is dimensioned to engage a steering wheel, and the lip is dimensioned to present the display at an ergonomically desirable angle with respect to a laptop user. The method further provides engaging the hook arrangement with the steering wheel, lowering the workstation support until the standoff rests against the steering wheel, mounting the base of the laptop in the support, and opening the laptop until the display is ergonomically presented to the user.

In accordance with a further aspect of the invention, a method of mounting a laptop computer having a display and a base with a keyboard on a flat surface involves providing a workstation support with a hook arrangement, standoff member, and a support portions. The support portion has a lower region with a lip. The support is dimensioned to support on its front at least the laptop base, the hook arrangement is dimensioned to engage a steering wheel, and the lip and standoff are dimensioned to present the display at an ergonomically desirable angle with respect to a laptop viewer.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Use of a laptop outside of an office environment is a critical aspect of many vocations. Since many of these vocations are mobile, the laptop is often accessed inside a car, most often by a user seated in the driver's seat. Effective use of the laptop relies on the keyboard and display being presented to the user at the appropriate distance and angle. Although a steering wheel may provide a temporary support, the lack of stability and positioning may result in inefficient and ineffective use.

Ideally, a user should be able to attach and detach a steering wheel workstation support for a laptop and mount the laptop itself quickly and effectively. The laptop should be secured with a minimum of attention to attachment mechanisms. The keyboard should be elevated at an angle that minimizes wrist and arm stress, permitting extended and accurate use. The display should be held approximately normal to the user's line of vision conveniently at eye level to minimize neck strain. Since the same laptop is often used for office presentation, it would be advantageous to use the same steering wheel workstation support to hold the laptop on a table during the presentation. Various embodiments of the invention provide both a secure and ergonomically desirable steering wheel workstation support for a laptop and, unmodified, an effective tabletop presentation mount for the computer.

Figure 1:
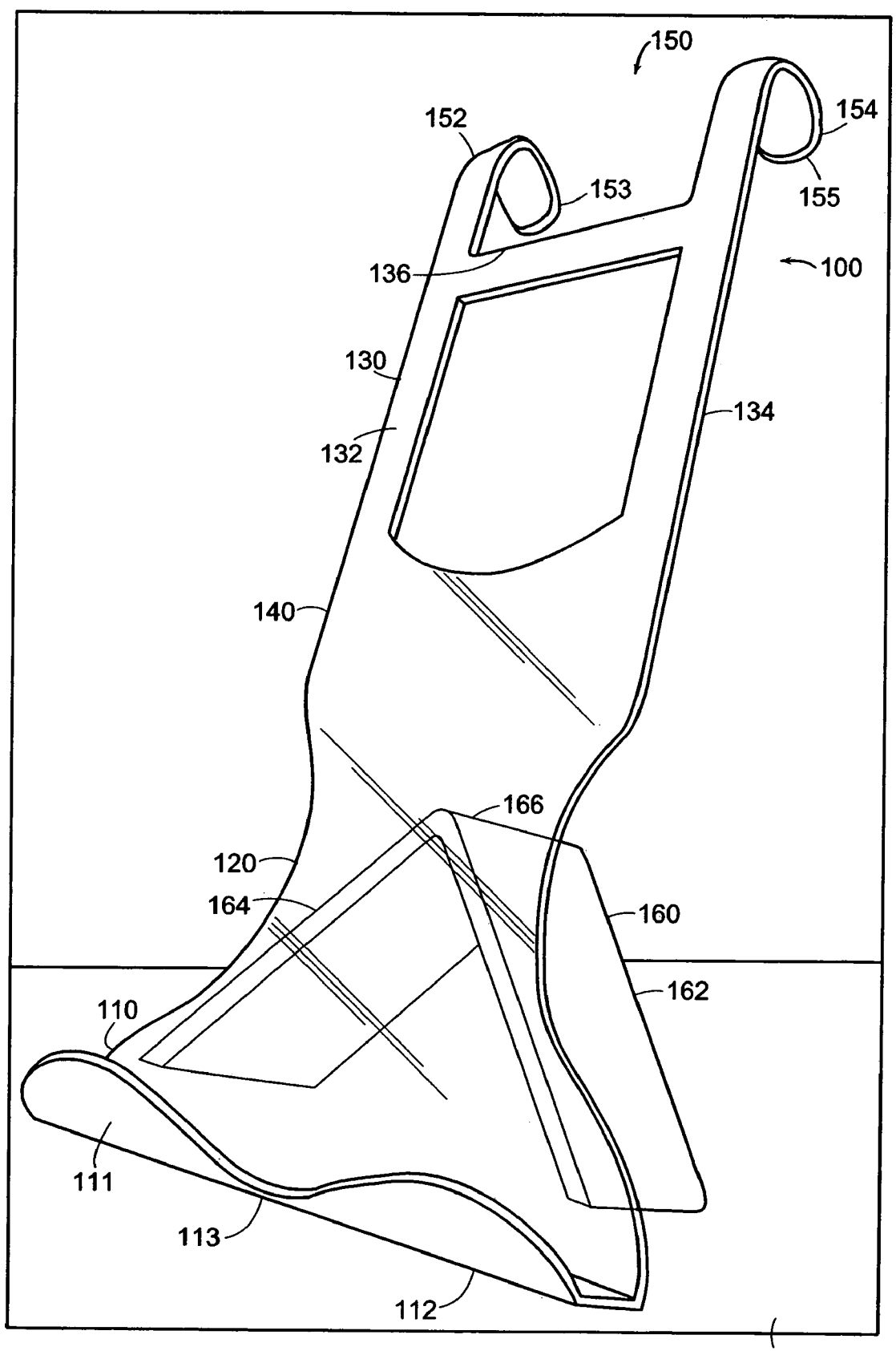
FIG. 1 shows a front view of an illustrative embodiment of a steering wheel workstation support.

FIG. 1 shows a front view of steering wheel workstation support 100. Workstation support 100 contains a support portion 140 with a lower region 120 and an upper region 130. Lip 110 attaches to the lower region 120 and is curved. Hook arrangement 150 attaches to the upper region 130. Standoff member 160 attaches to the back 244 of support portion 140.

In this embodiment, the standoff member 160 is extended as a pair of supports 162 and 164 approximately normal to the back 244 of the support portion 140 and is mounted so that at the junction 166 of the supports 162 and 164 with the back 244 of support portion 140 an inverted "V" is formed. As described below in further detail below, the particular geometry of the standoff member 160, including the extent of standoff member 160 from the plane of support portion 140 (3 inches (7.6 cm) in this embodiment), permits standoff member 160 both to provide an ergonomically desirable position for a laptop keyboard 460 when the workstation support 100 is installed on the steering wheel 315 and to support the support portion 140 at an angle on a horizontal surface 170 so that the workstation support 100 may also be used as a tabletop display for a laptop 420.

Figure 2:
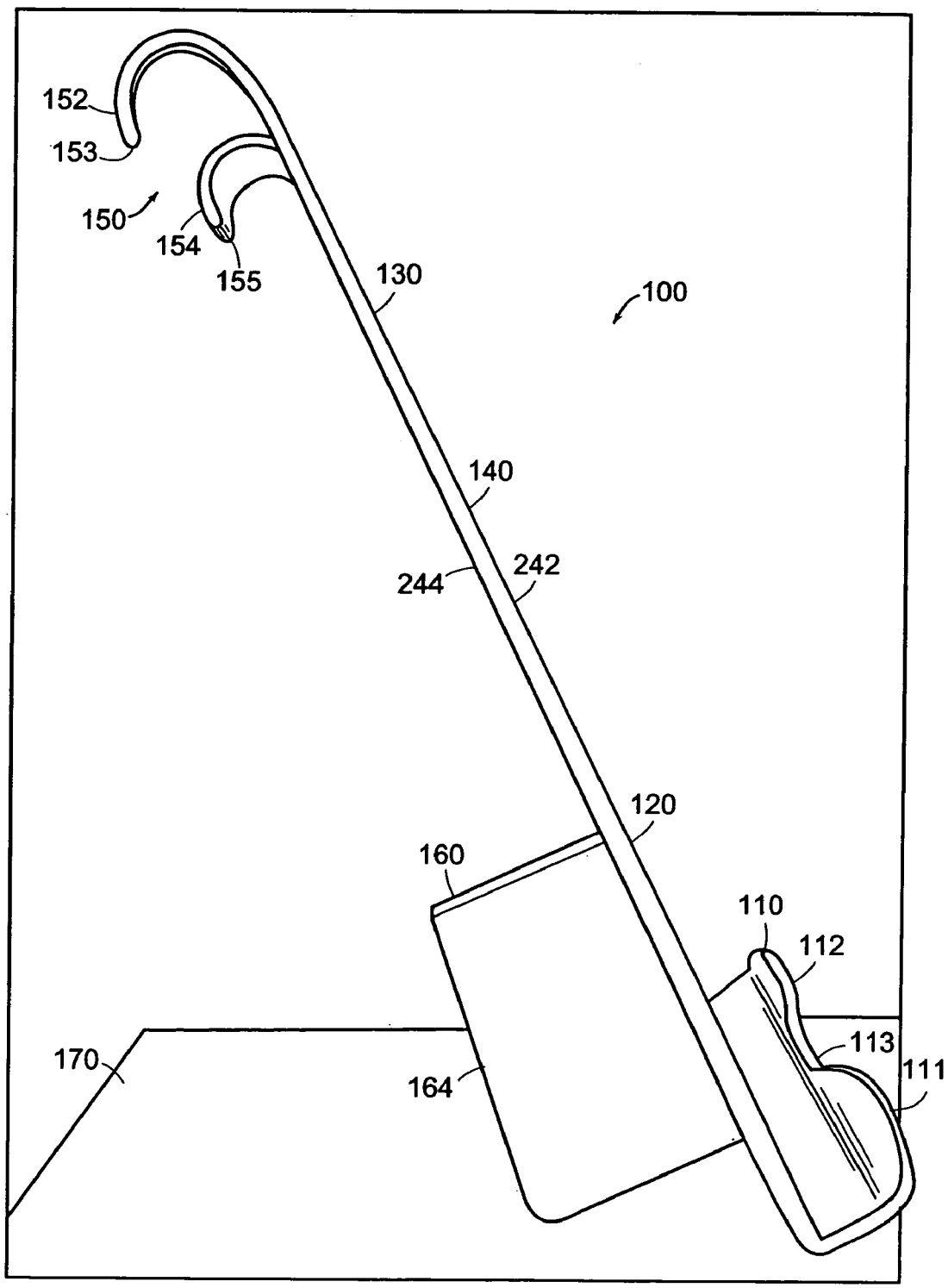
FIG. 2 shows a side view of an illustrative embodiment of a steering wheel workstation support.

The geometry of the standoff member 160 in relation to the hook arrangement 150 and the support portion 140 permits the workstation support 100 to accommodate a wide range of steering wheel diameters (typically about 14 to 16 inches). To attain this result, it is desirable that the support portion 140 have a length measured along its surface perpendicular to the lip 110 of not less than 9 inches (23 cm). Implementation of one standoff member 160 as an inverted "V" with an angle of 90 degrees between arm 162 and arm 164 gives the standoff member 160 strength while also adding rigidity to the support portion 140. However, the standoff member 160 may also be suitably implemented, for example, as an inverted "U", an "A", or in numerous other configurations to supply similar benefits. FIG. 2 shows a side view of steering wheel workstation support 100, including front 242 and back 244 of support portion 140.

Steering wheel workstation support 100 may be made of any of a number of materials and with any of a number of techniques. Because its high strength allows for a thinner structure, Lexan™ plastic is an attractive material. Workstation support 100 may be made as one piece by an injection molding process where the curves associated with lip 110 and hooks 152 and 153 are impressed on the material during manufacture of workstation support 100.

The lip 110 is implemented here as a pair of retainers, 111 and 112, on opposite sides of a central region 113 that is devoid of a retaining portion. This geometry permits the user more easily to access a mouse pad 435 or other computer controls that are located in the forward (i.e., lower) portion of the laptop base 430 when the laptop is in the workstation support 100. Alternatively, the user may choose to place a ring binder in the workstation support 100, and this particular lip configuration facilitates turning of pages in the binder. The retainers 111 and 112 may also incorporate an outward flare so that they are directed away from the plane of the support portion 140. This enables more convenient insertion of the laptop base 430 into the lip 110. Lip 110 has a width of about 8.5 inches in this embodiment and can accommodate the typical laptop computer base 430.

Upper region 130 of support portion 140 extends toward hook arrangement 150 as arms 132 and 134. Prior to reaching hook arrangement 150 at hooks 152 and 154, the arms 132 and 134 are connected via a crosspiece 136. Crosspiece 136 provides rigidity to the upper portion 130 and prevents spreading apart of arms 132 and 134, thereby permitting the support portion 140 be narrower than the lip 110 and minimizing use of material. Reduction of material in the upper portion 130 adds to the stability of the workstation support 100 when used for tabletop presentation of the laptop 420.

Hooks 152 and 154 are extensions of arms 132 and 134 respectively and are curved toward support portion 140. As a result, hooks 152 and 154 simultaneously fit onto a left position 320 and a right position 330 of a steering wheel 315. A separation between the centers of hooks 152 and 154 of approximately 4 inches (10.2 cm) provides rigidity and stability. Terminus 153 of hook 152 and terminus 155 of hook 154 curve away from support portion 140 so as to permit easier installation of the workstation support 100.

Figure 3:
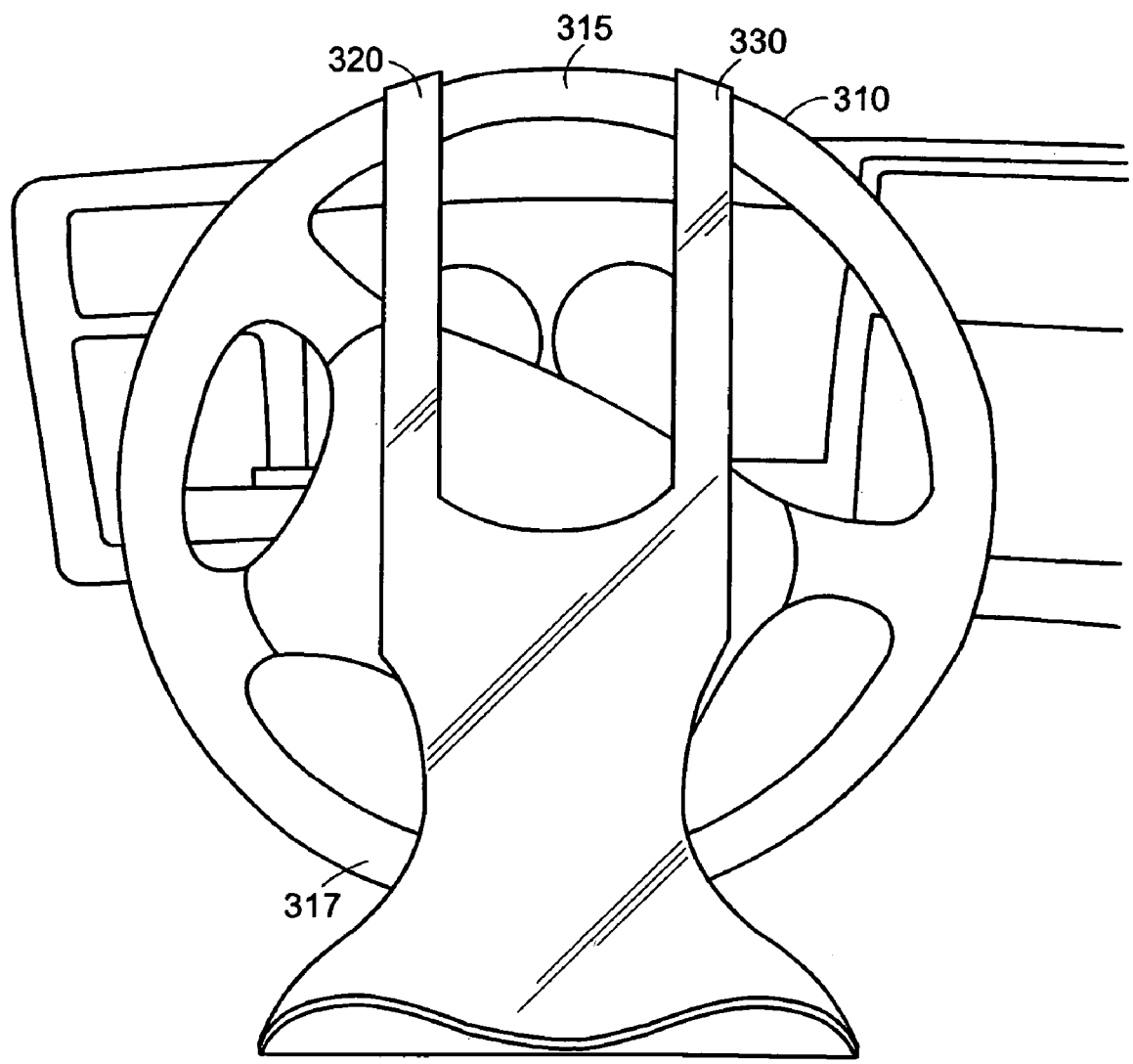
FIG. 3 shows a front view of an illustrative embodiment of a steering wheel workstation support attached to a steering wheel.

FIG. 3 shows a front view of the steering wheel workstation support 100 attached to a steering wheel 310. As the workstation support 100 is lowered, the hooks 152 and 154 engage steering wheel top 315 at symmetric positions 320 and 330, located at angles of approximately plus and minus 10 degrees with respect to the steering wheel top 315. After engagement of the hooks 152 and 154, standoff 160 of the workstation support 100 engages the steering wheel bottom 317 (see FIG. 4). As a result, the workstation support 100 is at an obtuse angle α (typically 145 degrees) with respect to the horizontal, as measured from the user side of the laptop (i.e., the front 242 of support portion 140), that is greater than the angle β (typically 120 degrees) of steering wheel 310 with respect to the horizontal, as measured from the user side of the laptop.

Figure 4:
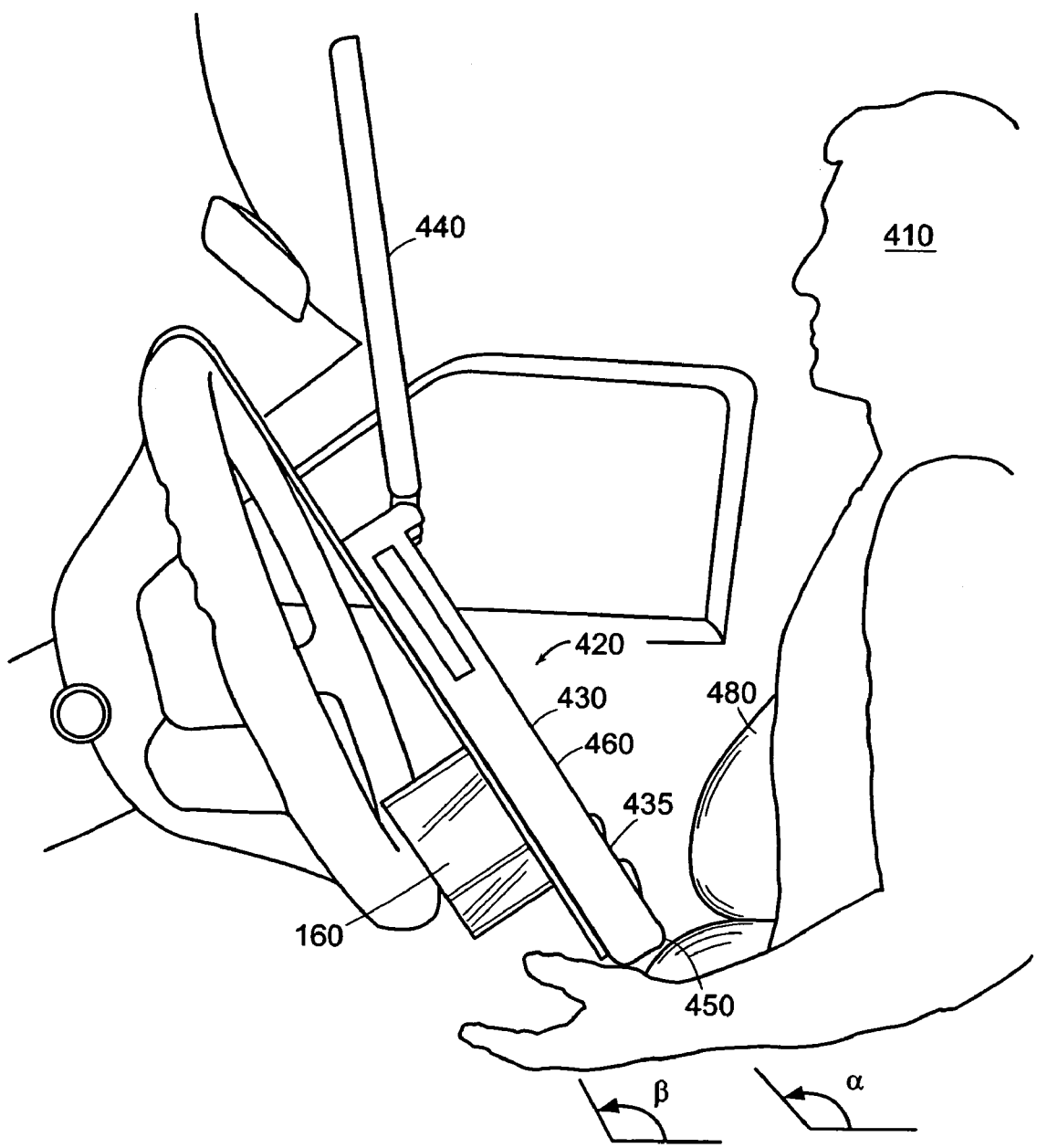
FIG. 4 shows a side view of an illustrative embodiment of a steering wheel workstation support attached to a steering wheel and holding an opened laptop before a user.

FIG. 4 shows a laptop 420 mounted on steering wheel workstation support 100 at angle α with respect to the horizontal. Angle α is ergonomically desirable for a laptop user 410 seated in driver's seat 480 in front of the laptop 420 to engage the laptop keyboard 460. Base 430 of laptop 420 fits within and is held by the lip 110. Display 440 of laptop 420 is opened by the user 410 and oriented substantially vertically with respect to user 410. As a result, the user 410 may comfortably work at laptop 420 from the driver's seat 480 while parked.

Figure 5:
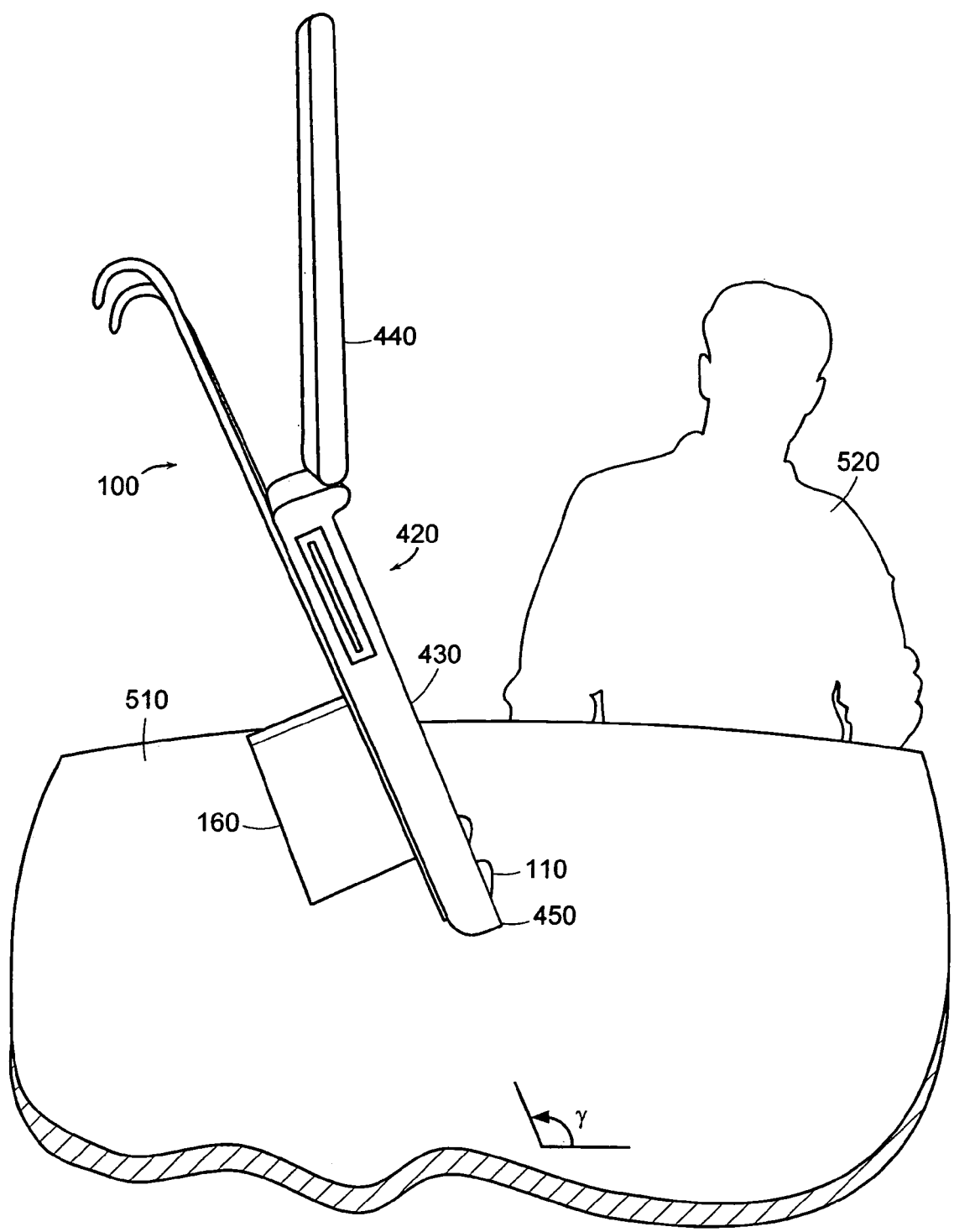
FIG. 5 shows a side view of a steering wheel workstation support resting on a tabletop and holding an opened laptop for presentation.

FIG. 5 shows workstation support 100 resting on a tabletop 510. In the event there is need to make a presentation, user 410 may take workstation support 100 and laptop 420 to the site of the presentation, either indoors or out doors. The workstation support 100 is placed on the tabletop 510 so as to rest stably on lip 110 and standoff 160 at obtuse angle γ (typically 130 degrees) with respect to the horizontal, as measured from the user side of the laptop. Laptop 420 is then placed so that lip 110 engages the front edge 450 of the base 430 and the display 440 is opened with respect to base 430. As a result, the laptop 420 is held stably in the workstation support 100 and the display 440 is visible to a viewer 520 from the perimeter of tabletop 510 as a consequence of its elevated position.

Figure 6:
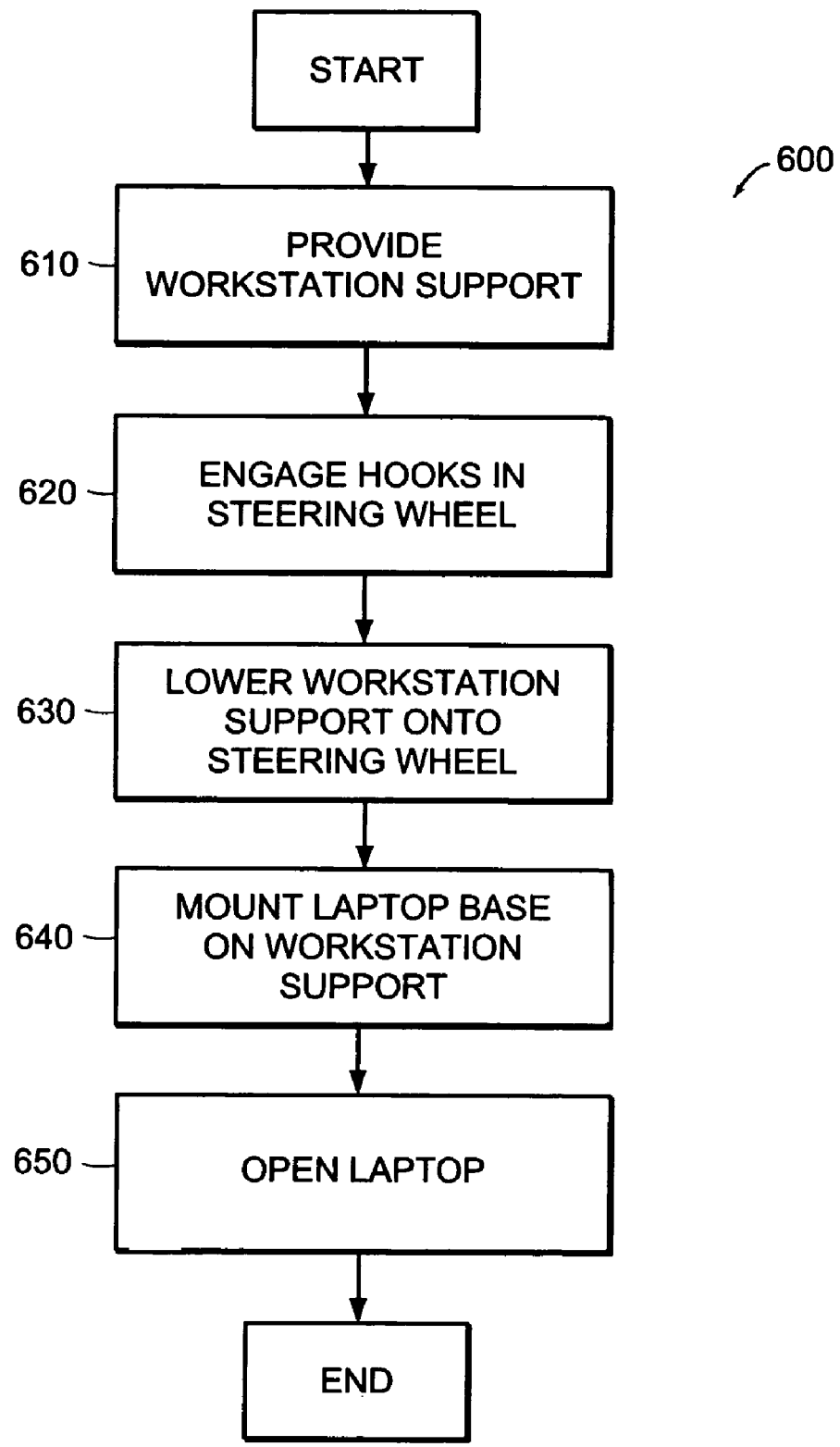
FIG. 6 shows a method for mounting a laptop on a steering wheel.

Method 600 for mounting laptop 420 on steering wheel 310 is summarized in FIG. 6. In Step 610, a steering wheel workstation support 100 is provided having an integral support portion 140, and integral hook arrangement 150, and an integral standoff member 160. The support portion 140, having a lower region 120 and an upper region 130, a back 244 and a front 242, is dimensioned to support the base 430 of the laptop computer 420. The hook arrangement 150 is dimensioned to engage the steering wheel 310. The standoff 160 is dimensioned to present the keyboard 460 at an ergonomically desirable angle with respect to a user of the laptop. In Step 620, the hook arrangement 150 is engaged with the steering wheel 310. In Step 630, the workstation support 100 is lowered until the standoff 160 rests against the steering wheel 310. In Step 640, the laptop base 430 is mounted on the workstation support 100. In Step 650, the laptop 420 is opened until the laptop display 480 is ergonomically presented to the user 410.

Figure 7:
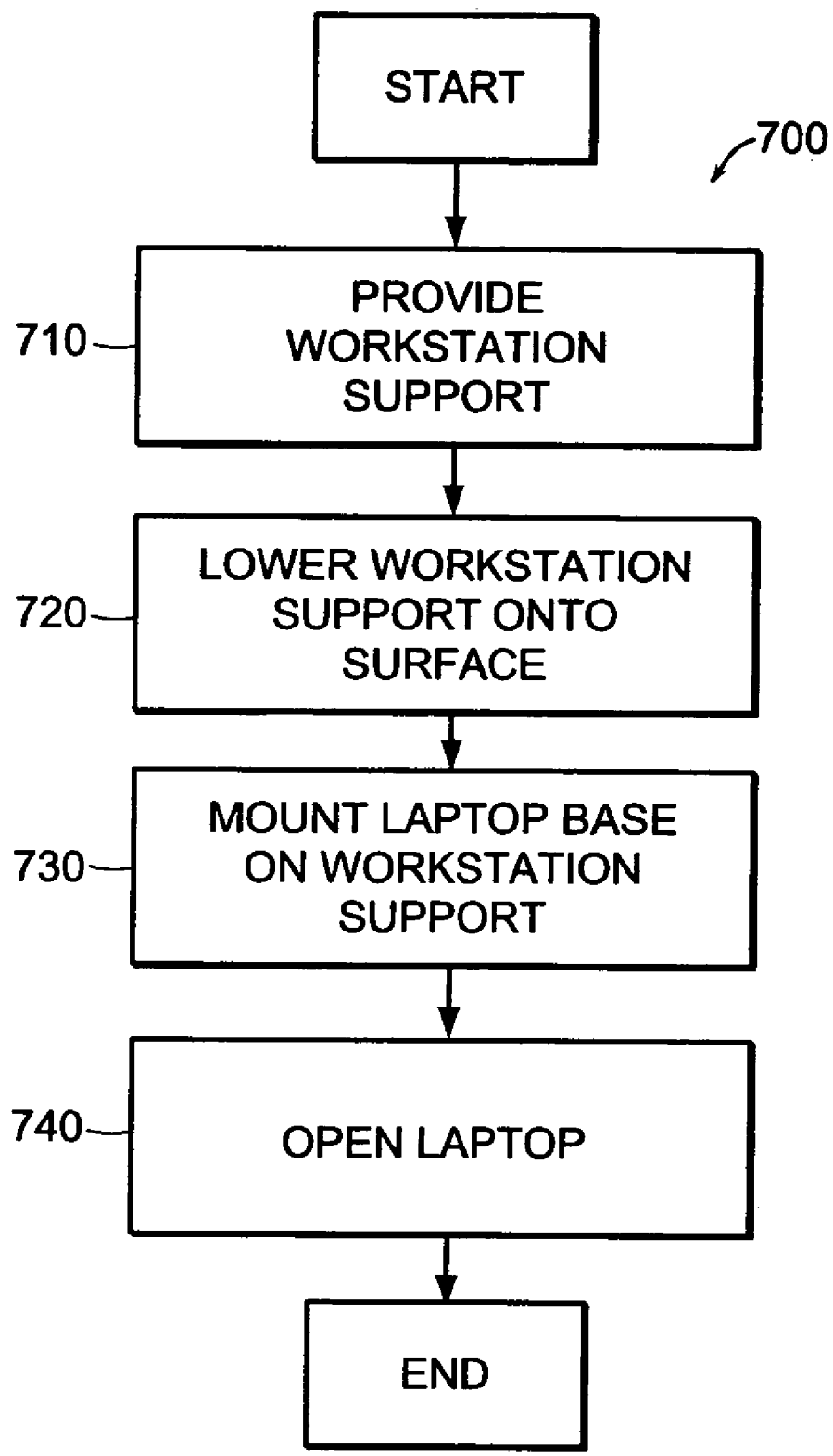
FIG. 7 shows a method for mounting a laptop on a flat surface.

Method 700 for mounting laptop 420 on a flat surface 510 is summarized in FIG. 7. In Step 710, a steering wheel workstation support 100 is provided having an support portion 140, and hook arrangement 150, and an standoff member 160. The support portion 140, having a lower region 120 and an upper region 130, a back 244 and a front 242, is dimensioned to support a laptop computer base 430. The hook arrangement 150 is dimensioned to engage a steering wheel 310. The standoff 160 and the lower region 120 of the support portion 140 are dimensioned to present a laptop display 440 at an ergonomically desirable angle with respect to a viewer 520 of the laptop 420. In Step 720, the workstation support 100 is lowered until the standoff 160 and the lower region 120 of the support 140 rest on the flat surface 510. In Step 730, the laptop base 430 is mounted on the workstation support 100. In Step 740, the laptop 420 is opened until the laptop display 440 is ergonomically presented to the viewer 520.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A steering wheel workstation support for a laptop computer, the laptop computer having a base and a display foldingly related to one another, the base having a front edge, the workstation support comprising:
    a support portion, the support portion having a lower region and an upper region and a back and a front, dimensioned to support on its front at least the base of the laptop, wherein the support portion contains a plurality of arms, each arm terminating in a hook and wherein a crosspiece connects the arms;
    a lip at the lower region of the support portion for receiving the front edge of the base of the laptop;
    a hook arrangement disposed to hook onto a steering wheel in the upper region of the support portion; and
    a standoff member, located on the back of the support portion, that is positioned to cause the lower end of the support portion to be displaced from a lower part of the steering wheel, the standoff member extending from the back of the support portion by first and second supports that meet at a junction behind the back of the support portion.

2. The steering wheel workstation support of claim 1, wherein the hook arrangement includes two hooks.

3. The steering wheel workstation support of claim 2, wherein each hook has a terminus that curves away from the support portion.

4. The steering wheel workstation support of claim 1, wherein the lip contains retainers disposed on opposite sides of a central region.

5. The steering wheel workstation support of claim 4, wherein the central region is void of the retainers.

6. The steering wheel workstation support of claim 1, wherein the support portion has height measured along its surface perpendicular to the lip of not less than 9 inches.

7. The steering wheel workstation support of claim 1, wherein the standoff member is configured in relation to the support portion to cause the workstation support, when in use on a steering wheel, to present the base of the laptop, to a user seated in a vehicle behind the steering wheel, at an obtuse angle relative to the horizontal, as measured from the front of the support portion, convenient to use of a keyboard on the base of the laptop.

8. The steering wheel workstation support of claim 1, wherein the standoff member has the shape of an inverted "V".

* * * * *